(12) United States Patent
Shaw

(10) Patent No.: US 6,196,254 B1
(45) Date of Patent: Mar. 6, 2001

(54) AIR VALVE ADAPTER

(75) Inventor: Alvis Hudson Shaw, Orange, TX (US)

(73) Assignee: Sportsstuff, Incc., Omaha, NE (US)

( * ) Notice: Subject to any disclaimer, the term of this patent is extended or adjusted under 35 U.S.C. 154(b) by 0 days.

(21) Appl. No.: 09/552,809

(22) Filed: Apr. 20, 2000

(51) Int. Cl.$^7$ ................................................ F16K 15/20
(52) U.S. Cl. .................................... 137/231; 137/223
(58) Field of Search .................. 137/223, 231, 137/232

(56) References Cited

U.S. PATENT DOCUMENTS

| | | | | |
|---|---|---|---|---|
| D. 311,055 | * | 10/1990 | Corley ................................ D23/233 |
| 3,827,635 | * | 8/1974 | Krakowski et al. ................. 239/391 |
| 3,933,177 | * | 1/1976 | Dwyer, Jr. ............................ 137/231 |
| 4,405,158 | * | 9/1983 | Huberman ................................ 289/7 |
| 4,653,550 | * | 3/1987 | Crowley ................................. 141/18 |
| 5,433,488 | * | 7/1995 | Chiago ............................. 285/148.19 |
| 5,509,438 | * | 4/1996 | Leonard et al. ..................... 137/231 |
| 5,605,356 | * | 2/1997 | Salvi ............................. 285/334.4 X |
| 5,746,243 | * | 5/1998 | Franke ................................. 137/231 |
| 6,120,010 | * | 9/2000 | Schaffer ............................ 267/64.28 |

* cited by examiner

Primary Examiner—John Rivell
Assistant Examiner—Meredith H. Schoenfeld
(74) Attorney, Agent, or Firm—Henderson & Sturm LLP

(57) ABSTRACT

An inflation valve fitting adapted for use with the typical inflation valve assembly found on large inflatable articles. The fitting allows inflation of articles using a conventional air hose with and end piece used to inflate tires, such as the air hoses available at most gasoline service stations. The fitting includes a body member having one threaded end and the other end being closed except for a small central opening. An auxiliary inflation valve, such as those used on automobile tires, has an enlarged section that frictionally engages the interior of the body member and a smaller terminal end that extends through the central opening. The terminal end selectively receives the end piece of the conventional air hose to rapidly and conveniently inflate the large inflatable article.

6 Claims, 1 Drawing Sheet

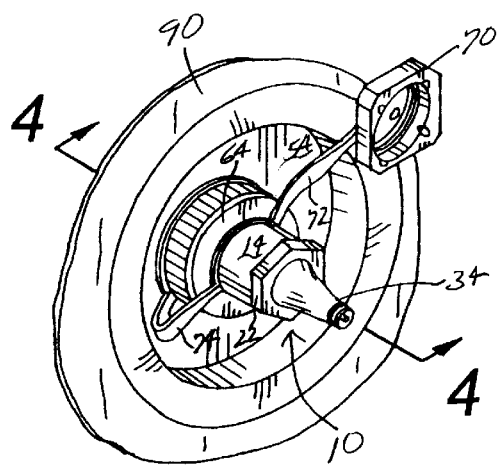
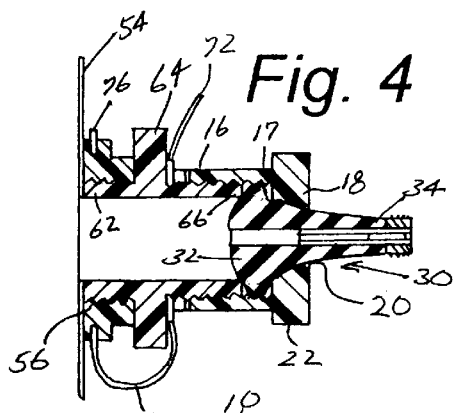
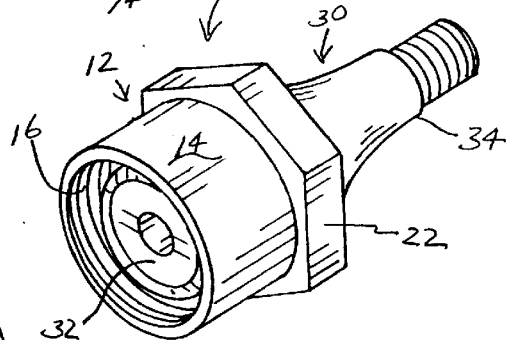
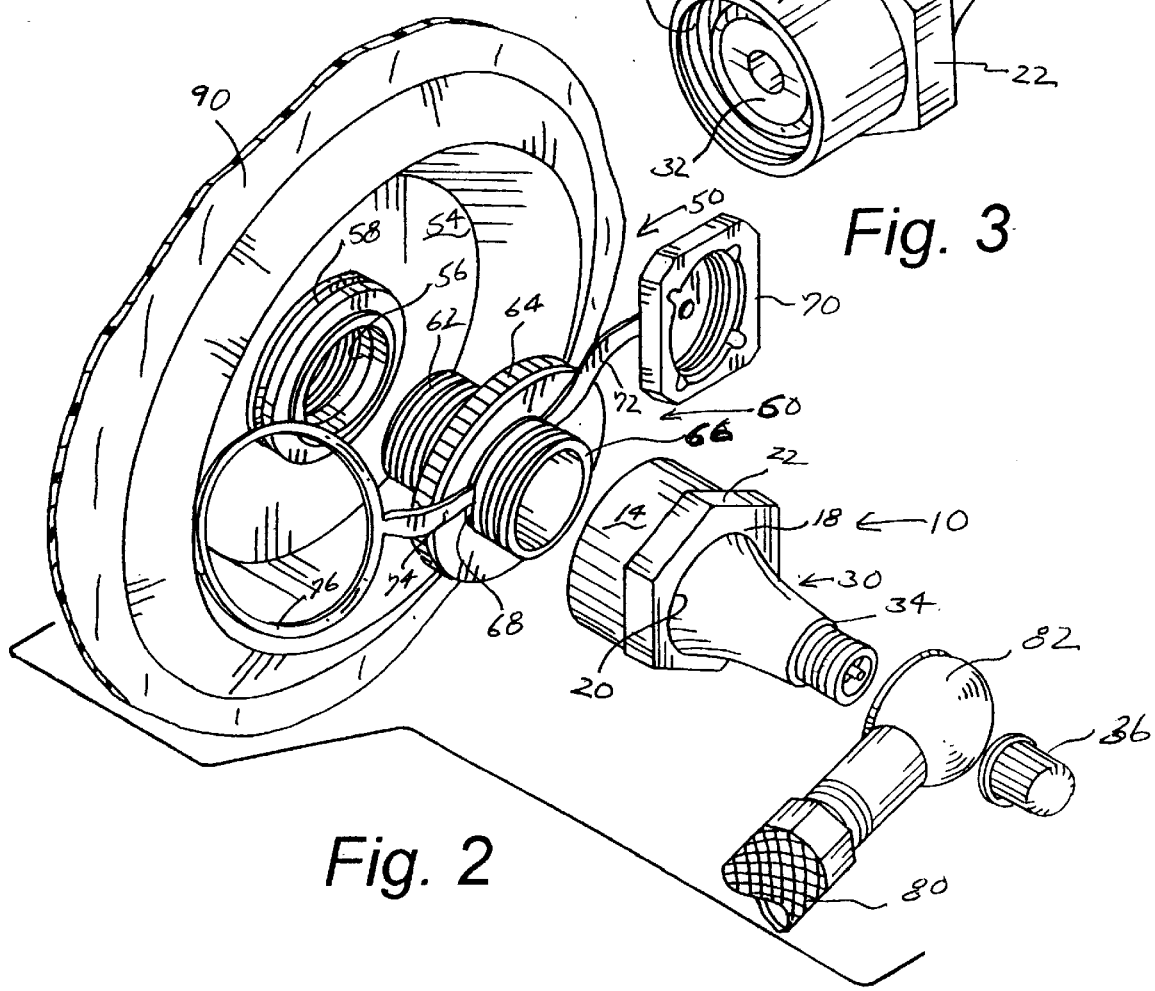

AIR VALVE ADAPTER

BACKGROUND OF THE INVENTION

1. Field of the Invention

The present invention relates to the field of accessories for inflatable articles, and more particularly to an inflation valve fitting that allows inflation using a conventional pressurized air hose used to inflate tires.

2. Description of Related Art

Large inflatable articles, such as those towed behind boats and snowmobiles, require a large volume of air to completely inflate. The typical inflation valve assembly used with these inflatable articles includes a large diameter threaded end that receives a complementary fitting of a small electrically powered portable air compressor.

While all of the aforementioned prior art constructions are more than adequate for the basic purpose and function for which they have been specifically designed, they are uniformly deficient with respect to their failure to provide a simple, efficient, and practical device that allows inflation of a large inflatable using a conventional air hose for inflating tires that is available at most gasoline service stations.

As a consequence of the foregoing situation, there has existed a longstanding need for a new and improved air valve adapter and the provision of such a construction is a stated objective of the present invention.

BRIEF SUMMARY OF THE INVENTION

Briefly stated, the present invention provides an inflation valve fitting adapted for use with the typical inflation valve assembly found on large inflatable articles. The fitting allows inflation of articles using a conventional air hose with and end piece used to inflate tires, such as that found on most of the air hoses available at gasoline service stations. The fitting includes a body member having one threaded end and the other end being closed except for a small central opening. An auxiliary inflation valve, such as those used on automobile tires, has an enlarged section that frictionally engages the interior of the body member and a smaller terminal end that extends through the central opening. The terminal end selectively receives the end piece of the conventional air hose to rapidly and conveniently inflate the large inflatable article.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a partial perspective view of the inflation valve adapter of the present invention threadably attached to the inflation valve assembly of an inflatable article;

FIG. 2 is an enlarged partial exploded perspective view illustrating the arrangement of the components, and showing a conventional service station air hose positioned to inflate the article;

FIG. 3 is a perspective view showing the bottom of the inflation valve adapter; and FIG. 4 is a sectional view showing the adapter attached to the inflation valve assembly of the inflatable article.

DETAILED DESCRIPTION OF THE INVENTION

As can be seen by reference to the drawings, the air valve adapter that forms the basis of the present invention is designated generally by the reference number 10. The adapter 10 includes a body member 12 having a cylindrical wall 14 with a lower threaded end 16 and an upper end 17 partially closed by an inwardly extending shoulder 18 having a central opening 20. The exterior of the body member 12 near the upper end 17 carries a hexagonal flange 22. An auxiliary inflation valve 30, such as that used on automobile tires, has an enlarged lower end 32 that is frictionally received in the interior of the body member 12 and a smaller terminal end 34 that extends through the central opening 20. A cap 36 attaches to and protects the threads on the terminal end 34.

The threaded end 16 of the adapter 10 is selectively attached to the threaded portion 66 of a typical inflation valve assembly 50 used with large inflatable articles 80, such as these towed behind boats or snowmobiles. FIG. 2 shows the valve assembly 50 having a recessed plate 54 attached to the inflatable 90 such as by thermowelding, gluing, or other conventional means. The recessed plate 54 has an interiorly threaded section 56 having an exterior annular groove 58. An inflation check valve 60 has a lower exteriorly threaded end 62, and enlarged flange 64, and upper exteriorly threaded end 66, and an annular recess 68. A threaded cap 70 is attached by a cap tether 72 at the annular recess 68. A valve tether 74 has an end ring 76 that attaches to the annular groove 58 and secures the check valve 60 to the inflatable 90.

In use with the check valve 60 attached to the inflatable 90, the cap 70 is removed and the adapter 10 is threadably attached so that the enlarged lower air discharge section 32 sealingly engages the upper end 62 of the check valve 60 (FIG. 4). A source of pressurized air that includes a flexible air hose 80 with an end piece 82 is used to fill the inflatable 90. The air hose 80 and end piece 82 are those generally found at gasoline filling stations to inflate automobile tires. When the inflatable 90 is filled to capacity, the adapter 10 is removed and the cap 70 is replaced. The adapter 10 provides a fast and efficient method of filing inflatables 90 without the need to carry a portable air compressor.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An inflation valve fitting adapted for use with an inflation valve operably attached to an inflatable chamber, the inflation valve assembly having an end with a threaded portion disposed exterior of the inflatable chamber and being in fluid communication with the interior of the inflatable chamber, the fitting comprising:

a body member including a cylindrical wall having an open end and a threaded section disposed to be selectively threadably attached to the threaded portion of the inflation valve assembly, and a second end having a radially extending shoulder member with a central opening;

an auxiliary inflation valve having an enlarged air discharge section disposed within the body member and disposed to frictionally engage the cylindrical wall, and an air intake section attached to the air discharge section and disposed to extend through the central opening exterior of the body member, the air intake section having a terminal end disposed to selectively receive pressurized air from a pressurized air source, whereby pressurized air passing through the auxiliary inflation valve passes through the inflation valve assembly into the inflatable chamber.

2. The inflation valve fitting of claim 1, wherein the threaded portion of the inflation valve assembly is externally threaded, and wherein the threaded section of the body member is internally threaded.

3. The inflation valve of claim 2, wherein the enlarged air discharge section of the auxiliary inflation valve frictionally engages the threaded section of the body member adjacent the shoulder member.

4. The inflation valve of claim 3, wherein the enlarged air discharge section is disposed to sealingly contact the end of the inflation valve assembly.

5. The inflation valve of claim 4, wherein the body member includes a hexagonal flange extending out from the cylindrical wall adjacent to the second end.

6. The inflation valve of claim 5, wherein, the terminal end of the air intake section of the auxiliary inflation valve is externally threaded.

* * * * *